United States Patent [19]

Takizawa

[11] Patent Number: 4,897,819

[45] Date of Patent: Jan. 30, 1990

[54] MEMORY PROTECTION CIRCUIT

[75] Inventor: Hiroshi Takizawa, Tokyo, Japan

[73] Assignee: NEC Corporation, Tokyo, Japan

[21] Appl. No.: 260,108

[22] Filed: Oct. 20, 1988

[30] Foreign Application Priority Data

Oct. 20, 1987 [JP] Japan .................. 62-265649

[51] Int. Cl.$^4$ .............................................. G11C 11/40
[52] U.S. Cl. ........................... 365/230.06; 365/189.01
[58] Field of Search ....................... 365/189.01, 189.04, 365/230.01, 230.06

[56] References Cited

U.S. PATENT DOCUMENTS 4,739,497 4/1988 Itoh et al. ...................... 365/230.06

Primary Examiner—Terrell W. Fears
Attorney, Agent, or Firm—Sughrue, Mion, Zinn, Macpeak & Seas

[57] ABSTRACT

A memory protection circuit is provided which prevents data stored in a programmable memory from being destroyed due to uncontrolled operations or malfunction of a writing unit. The memory protection circuit comprises a first decoder for detecting first predetermined data from write data, a second decoder for detecting second predetermined data out of address data which is associated with the write data, and a latch for latching a detection output of the first decoder when both a detection output of the second decoder and a write command signal exist, and for selectively allowing and inhibiting the write data from being written in a memory based on the information being latched.

22 Claims, 5 Drawing Sheets

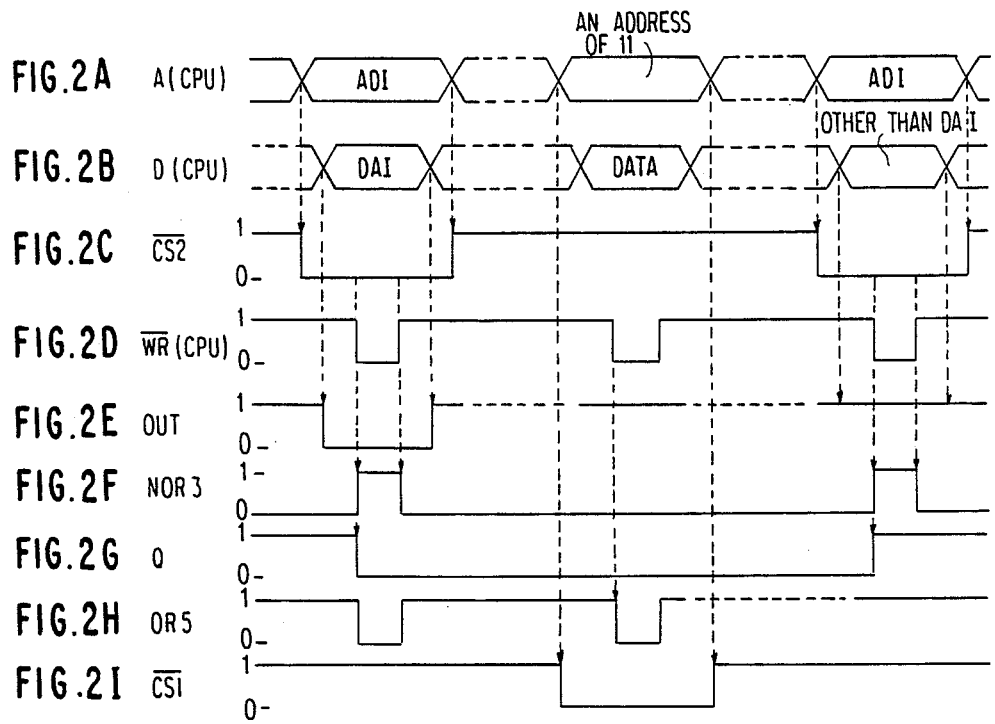
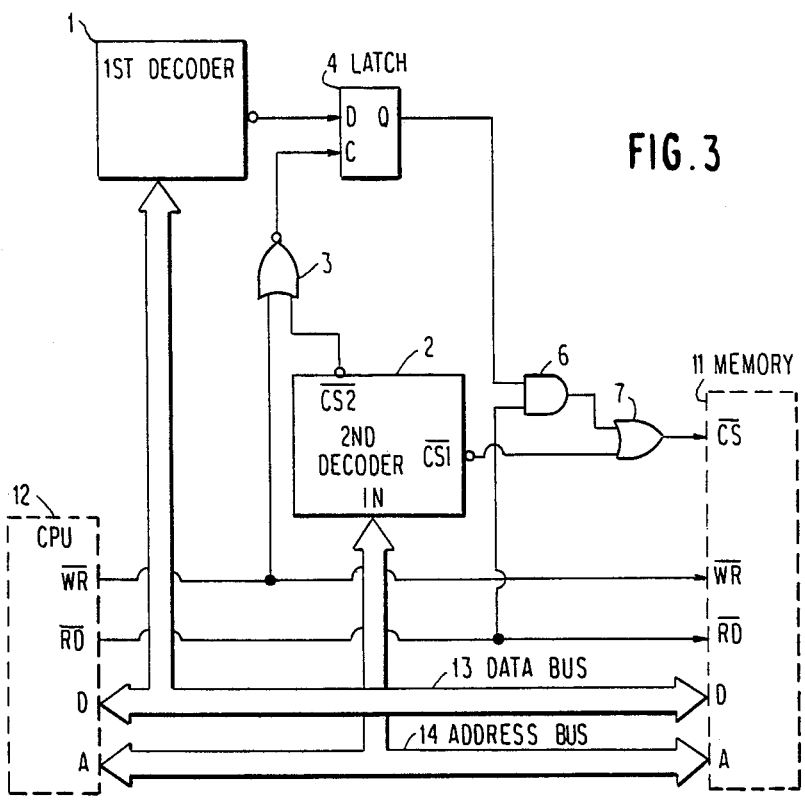

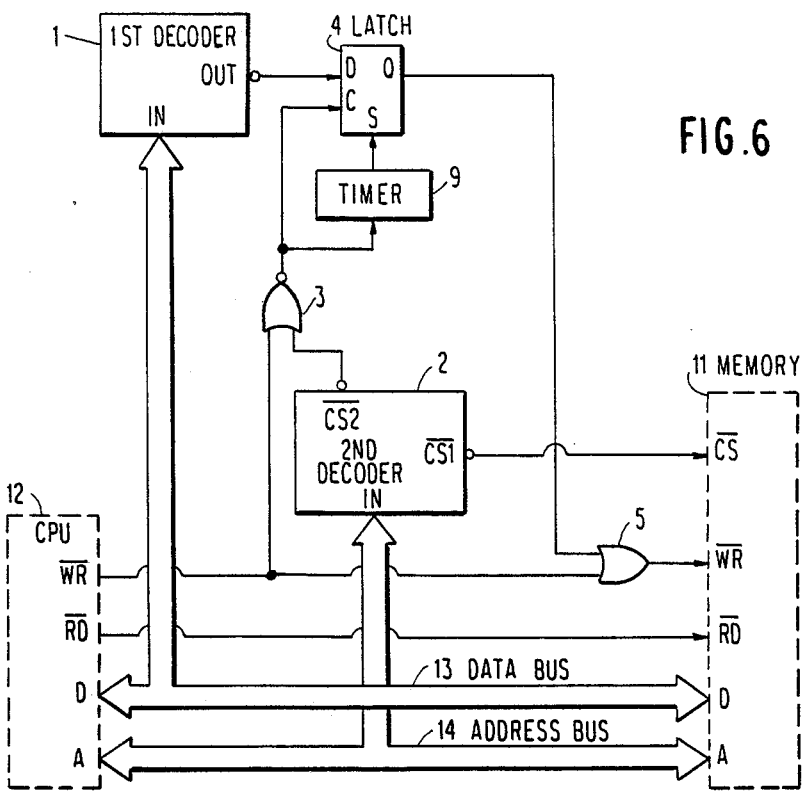
FIG.6
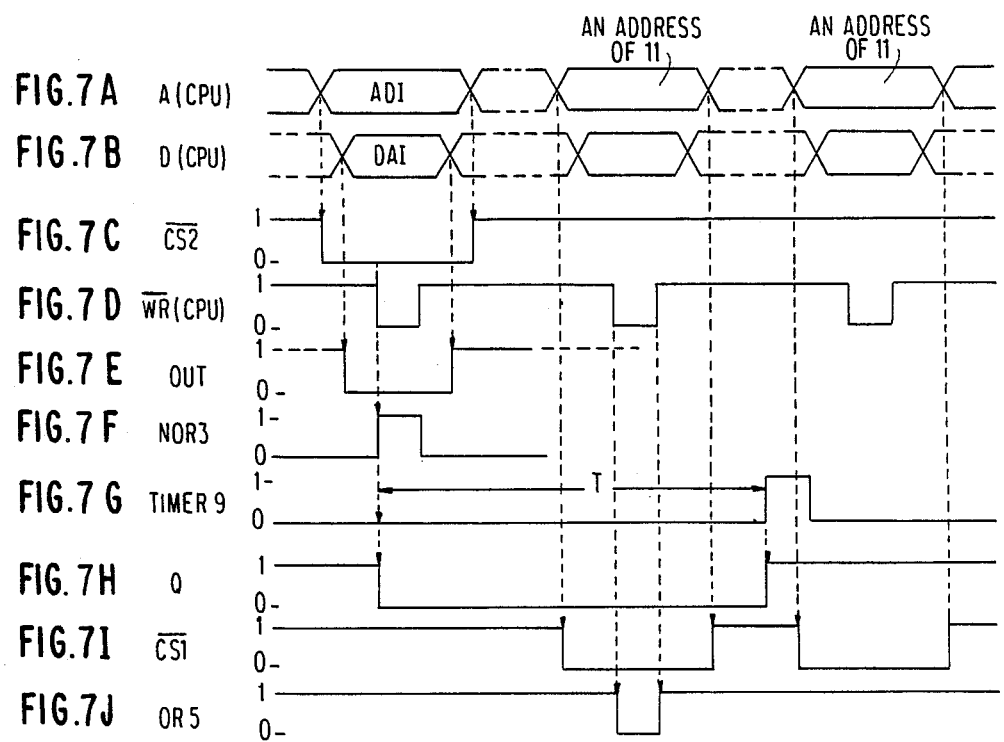

MEMORY PROTECTION CIRCUIT

BACKGROUND OF THE INVENTION

The present invention relates to a memory protection circuit and, more particularly, to a memory protection circuit for preventing data stored in a rewritable or programmable memory from being destroyed due to uncontrolled write operations of a writing unit.

A random access memory (RAM) and an electrically errasable programmable read-only memory (EE-PROM) are extensively used in modern electronic devices. A problem with such a rewritable or programmable memory is that data stored therein is easily destroyed when a central processing unit (CPU) or similar writing unit adapted to write data into the memory operates out of control. Heretofore, the programmable memory has not been provided with any protective measure against the uncontrolled operations of the writing unit.

SUMMARY OF THE INVENTION

It is therefore an object of the present invention to provide a memory protection circuit which prevents data stored in a programmable memory from being destroyed due to the uncontrolled operations or malfunction of a writing unit.

A memory protection circuit in accordance with the present invention comprises a first decoder for detecting first predetermined data out of write data, a second decoder for detecting second predetermined data out of address data which are associated with the write data, and a latch for latching a detection output of the first decoder when both a detection output of the second decoder and a write command signal exist, and for selectively allowing and inhibiting the write data from being written in a memory based on the content being latched.

BRIEF DESCRIPTION OF THE DRAWINGS

The above and other objects, features and advantages of the present invention will become more apparent from the following description taken with the accompanying drawings in which:

FIGS. 2A to 2I are timing charts useful for understanding the operation of the circuit shown in FIG. 1;

FIGS. 3 to 6 are schematic block diagrams each showing a different alternative embodiment of the present invention; and FIGS. 7A to 7J are timing charts explaining the operation of the circuit shown in FIG. 6.

DETAILED DESCRIPTION OF THE PREFERRED EMBODIMENTS

Figure 1:
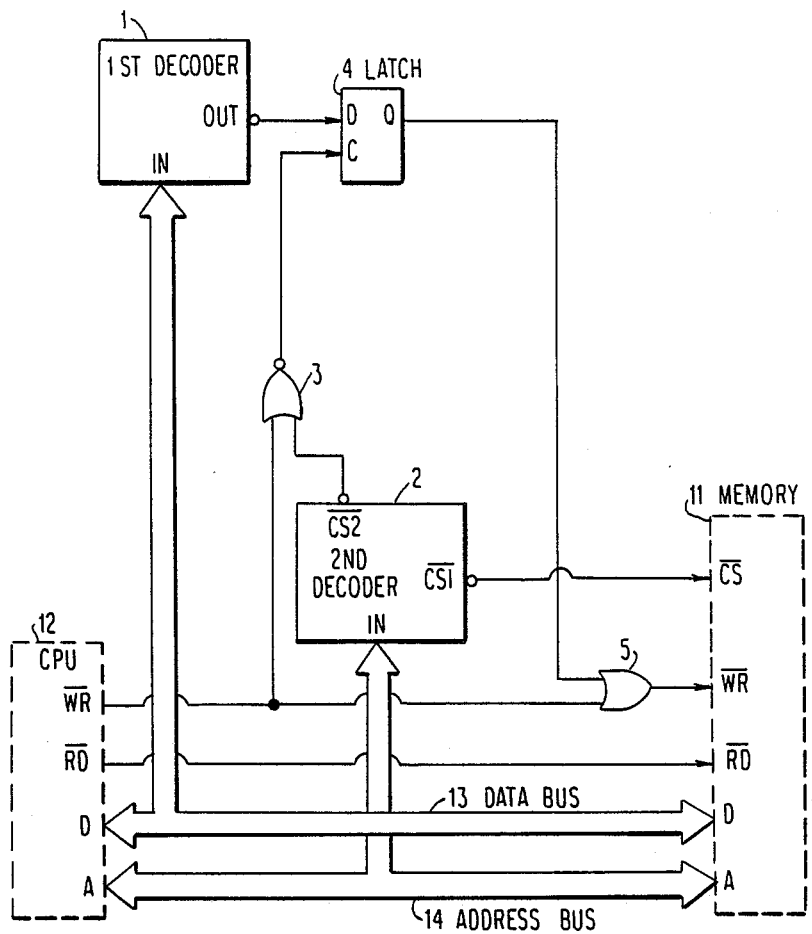
FIG. 1 is a block diagram schematically showing a memory protection circuit embodying the present invention.

Referring to FIG. 1, a memory protection circuit embodying the present invention includes a first decoder 1, a second decoder 2, a NOR gate 3, a D-type flip-flop (latch) 4, and an OR gate 5. A rewritable or programmable memory to be protected by the protection circuit is designated by reference numeral 11.

The memory 11 has a data terminal D connected to a data bus 13 and an address terminal A connected to an address bus 14. The memory 11 is enabled when its chip select terminal $\overline{CS}$ is a (logical) ZERO. When a write terminal $\overline{WR}$ of memory 11 is a ZERO, the memory 11 writes data coming in over the data bus 13 in those memory locations which are designated by address data that come in over the address bus 14. When a read terminal $\overline{RD}$ of memory 11 is a ZERO, the memory 11 outputs data stored in the memory locations which are designated by address data coming in over the address bus 14.

A CPU 12 is provided for writing and reading data in and out of the memory 11. The CPU 12 has a data terminal D connected to the data bus 13, an address terminal A connected to the address bus 14, a write terminal $\overline{WR}$ which becomes a ZERO in a write mode, and a read terminal $\overline{RD}$ which becomes a ZERO in a read mode.

The first decoder 1 has an input terminal IN and an output terminal OUT which are respectively connected to the data bus 13 and a data terminal D of latch 4. The second decoder 2 has an input terminal IN connected to the address bus 14, and output terminals $\overline{CS1}$ and $\overline{CS2}$ connected respectively to the terminal CS of memory 11 and one input terminal of NOR gate 3. The first and second decoders 1 and 2 may each be implemented by a simple logical circuit.

The other input terminal of NOR gate 3 is connected to the terminal $\overline{WR}$ of CPU 12 while the output terminal of NOR gate 3 is connected to a clock terminal C of latch 4. An output terminal Q of latch 4 is connected to the terminal $\overline{WR}$ of memory 11 through OR gate 5, and an output terminal of CPU 12 is also connected to the terminal $\overline{WR}$ of memory 11 through OR gate 5. Further, the terminal $\overline{RD}$ of CPU 12 is connected to the terminal $\overline{RD}$ of memory 11.

The operation of the memory protection circuit having the above construction will now be described with reference to FIGS. 2A to 2I.

As shown in FIG. 2B, data DAI having a predetermined pattern is added to the beginning of a sequence of data to be written in the memory 11 by CPU 12. As shown in FIG. 2A, address data ADI indicating a memory location into which the data DAI is to be stored is added to the beginning of a sequence of address data. Further, data which is different from the data DAI is added at the end of the data sequence to be written, as shown at the right-hand side of FIG. 2B, while the address data ADI is added to the end of the sequence of address, as shown in the right-hand side of FIG. 2A.

When the data DAI is applied to the first decoder 1 over the data bus 13, the output terminal OUT of first decoder 1 becomes a ZERO, as shown in FIG. 2E. At the same time, the data ADI is applied to the second decoder 2 over the address bus 14 to turn its terminal $\overline{CS2}$ to a ZERO, as shown in FIG. 2C. At this instance, the terminal $\overline{WR}$ of CPU 12 is a ZERO, as shown in FIG. 2D. Hence, the NOR gate 3 outputs a (logical) ONE, as shown in FIG. 2F. This causes the latch 4 to latch a ZERO and turns its output Q to a ZERO, as shown in FIG. 2G. The OR gate 5 therefore produces a ZERO, as shown in FIG. 2H. While the writing operation is under way, the terminal $\overline{CS1}$ of the decoder 2 remains a ZERO (see FIG. 2I). Consequently, the terminals $\overline{CS}$ and $\overline{WR}$ of memory 11 become a ZERO making the memory 11 ready to start writing data therein.

At the end of the writing operation, the data other than DAI shown in FIG. 2B is applied to the decoder 1 and the data ADI shown in FIG. 2A is applied to the decoder 2. In this condition, the latch 4 latches a ONE (FIG. 2G) so that the OR gate 5 outputs a ONE, as shown in FIG. 2H. As a result, the memory 11 becomes unable to write data therein any further.

As described above, a write command signal (the status of terminal $\overline{WR}$) outputted by CPU 12 is gated by OR gate 5 and then fed to the terminal $\overline{WR}$ of memory 11 (see FIG. 1). The protection circuit therefore allows and inhibits data from being written in the memory 11 based on the data which is latched on the latch 4. The possibility that data on the data bus 13 becomes DAI and, at the same time, data on the address bus 14 becomes ADI due to the uncontrolled operations or malfunction of CPU 12 is rare. It follows that even when CPU 12 runs out of control, it hardly occurs that the output terminal Q of latch 4 becomes a ZERO, i.e., that unexpected data is written in the memory 11. This successfully protects data stored in the memory 11 against destruction due to the malfunction of CPU 12.

In summary, the memory protection circuit of FIG. 1 is constructed such that data is allowed to be written in a memory only when particular write data DAI having particular address data ADI is detected. Moreover, when data is detected having the same address data ADI but different data DAI, the write-in is inhibited. Hence, by selecting data DAI as the leading data of a data sequence to be written in memory, by selecting data ADI as address data associated with the leading data, by formatting the last data in the data sequence to be written differently from the data DAI, and by selecting its associated address data to be the data ADI, it is possible to prevent data stored in the memory from being destroyed due to the malfunction of the writing unit.

Referring to FIG. 3, an alternative embodiment of the present invention is shown in a schematic block diagram. This embodiment is essentially similar to the embodiment of FIG. 2 except that the OR gate 5 of FIG. 1 is omitted and that an AND gate 6 and an OR gate 7 are added. The AND gate 6 is connected at one input terminal thereof to the output terminal Q of latch 4 and at the other input terminal to the terminal $\overline{RD}$ of CPU 12. The OR gate 7 is connected at one input terminal to the output terminal of AND gate 6, at the other input terminal to the terminal $\overline{CS1}$ of second decoder 2, and at an output terminal to the terminal $\overline{CS}$ of memory 11. In this particular embodiment, the terminal $\overline{WR}$ of memory 11 is directly connected to the terminal $\overline{WR}$ of CPU 12.

The operation of the circuit shown in FIG. 3 is the same as that of the circuit shown in FIG. 1 so far as the latch 4 which latches a ZERO at the start of writing and a ONE at the end of writing is concerned. In the writing operation, the output of AND gate 6 and that of OR gate 7 become a ZERO to allow data to be written in the memory 11. At the end of writing, the terminal Q of latch 4 and the terminal $\overline{RD}$ of CPU 12 are a ONE so that the AND gate 6 and the OR gate 7 produce a ONE, inhibiting any further data to be written in the memory 11.

In a read mode operation, the terminal $\overline{RD}$ of CPU 12 becomes a ZERO causing the AND gate 6 to produce a ZERO inespective of the data being latched on the latch 4. The OR gate 7 therefore delivers the status of the terminal $\overline{CS1}$ of second decoder 2 directly to the terminal $\overline{CS}$ of memory 11, enabling the memory 11 so that data can be read therefrom.

In the manner described above, the OR gate 7 gates a chip select signal (the status of terminal $\overline{CS1}$) outputted from the decoder 2 and then feeds it to the terminal $\overline{CS}$ of memory 11. More specifically, the circuit of FIG. 3 allows and inhibits data from being written in the memory 11 on the basis of the data being latched on the latch 4. Again, the output terminal Q of latch 4 rarely becomes a ZERO even when CPU 12 runs out of control. Hence, the probability that both the terminals $\overline{WR}$ and $\overline{RD}$ of CPU 12 and therefore both the terminals $\overline{CS}$ and $\overline{WR}$ of memory 11 become a ZERO due to the malfunction of the CPU 12 is substantially zero. The memory 11 is therefore fully protected from destruction due to such a fault of CPU 12.

Figure 4:
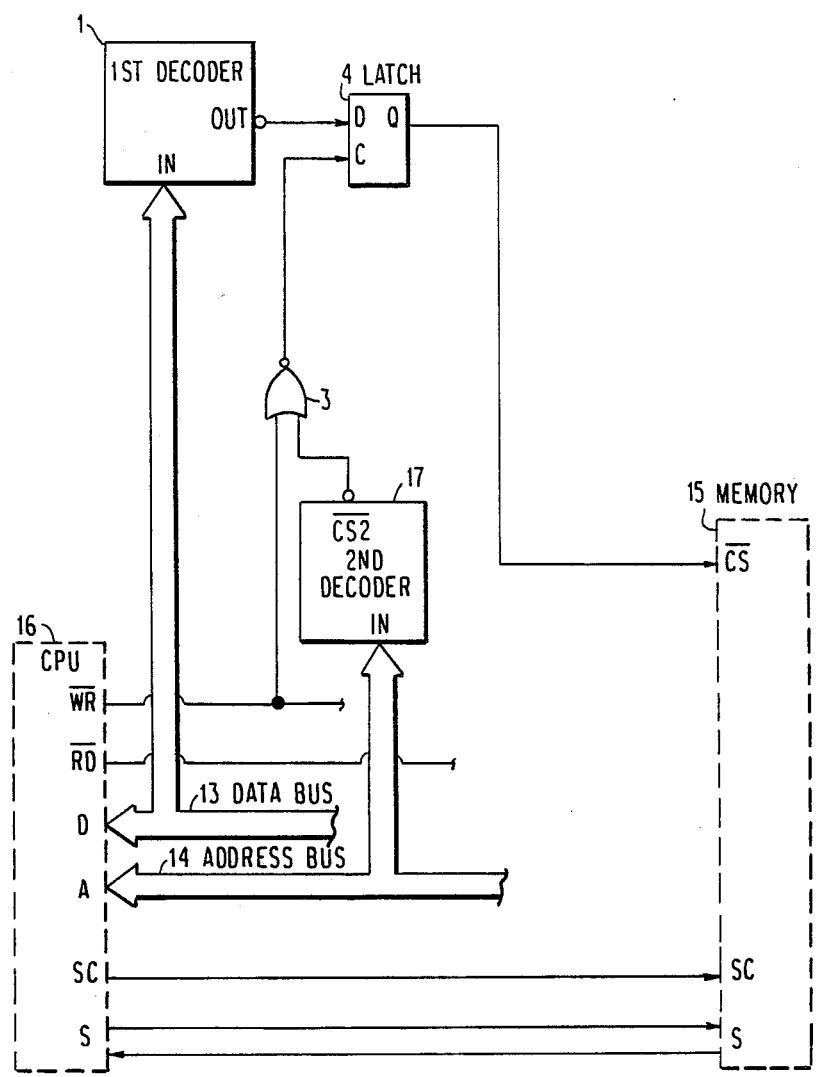

Referring to FIG. 4, another alternative embodiment of the present invention is shown. In this particular embodiment, the memory to be protected is a serial input-output memory 15. When the terminal $\overline{CS}$ of memory 15 is a ZERO, the memory 15 is enabled in synchronizm with a serial clock supplied at a serial clock terminal SC from CPU 16. When enabled, the memory 15 receives a write command signal, read command signal, data to be written, and address data in the form of serial data via a serial terminal S and delivers data to be read out of memory 15 in the form of serial data via the serial terminal S.

CPU 16 shown in FIG. 4 is adapted to read and write data from and in the memory 15, CPU 16 has a serial clock terminal SC for delivering the serial clock to the memory 15 and a serial terminal S for interchanging serial data with the memory 15, in addition to the terminals $\overline{WR}$, $\overline{RD}$, D and A.

The memory protection circuit of FIG. 4 is constructed by substituting a decoder 17 without the terminal $\overline{CS1}$ for the decoder 2 of the embodiment of FIG. 1, omitting the OR gate 5, and connecting the output terminal Q of latch 4 to the terminal $\overline{CS}$ of memory 15. The embodiment of FIG. 4 is identical with the embodiment of FIG. 3 in that it allows and inhibits data from being written in the memory 15 on the basis of the status of the terminal $\overline{CS}$ of memory 15, and in that such a control eliminates the destruction of data stored in the memory 15 when CPU 16 runs out of control.

Figure 5:
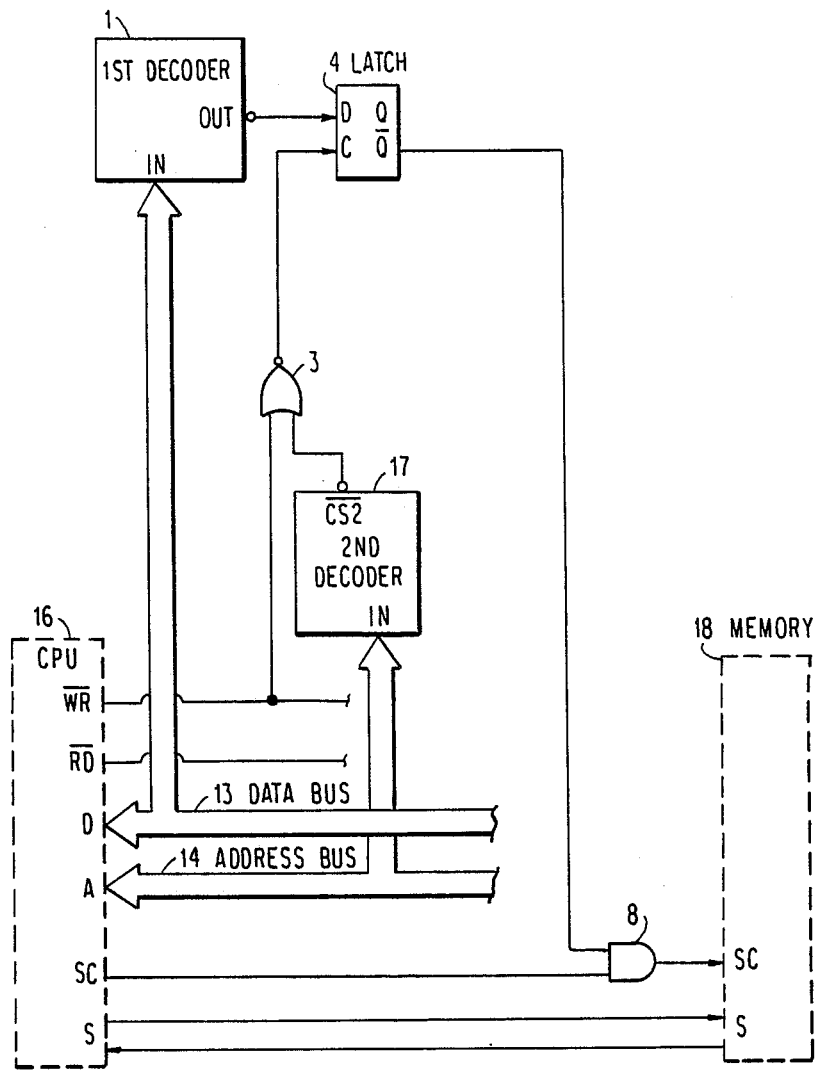

Referring to FIG. 5, still another alternative embodiment of the present invention is shown and also constructed to protect a serial input-output memory 18. The circuit of FIG. 5 is essentially similar to that of FIG. 4 except for an additional AND gate 8. The AND gate 8 is connected at one input terminal to the output terminal $\overline{Q}$ of latch 4, at the other input terminal to the serial clock terminal SC of CPU 16, and at an output terminal to the serial clock terminal SC of memory 18. It should be noted that the memory 18 in this particular embodiment lacks the terminal $\overline{CS}$. As stated earlier in relation to the embodiment of FIG. 1, the output terminal Q of latch 4 becomes a ZERO at the beginning of writing, which to in turn makes the output terminal $\overline{Q}$ a ONE. Consequently, a serial clock is fed from the AND gate 8 to the memory 18 to prepare the memory 18 for inputting and outputting data. At the end of writing, the output terminal $\overline{Q}$ of latch 4 becomes a ZERO so that the AND gate 8 does not deliver the serial clock to disable the memory 18.

As stated above, the memory protection circuit of FIG. 5 gates the serial clock from CPU 16 by the AND gate 8 and then applies it to the memory 18 to thereby selectively allow and inhibit data from being written in or read out of the memory 18 on the basis of the content of latch 4. This kind of control also safeguards data lodged in the memory 18 against disturbance when CPU 16 operates out of control.

Referring to FIG. 6, a further alternative embodiment of the present invention is shown and constructed by adding a timer 9 to the embodiment of FIG. 1. The operation of the memory protection circuit shown in FIG. 6 will now be described with reference to FIGS. 7A to 7J.

The timer 9 is started when the NOR gate 3 produces a ONE, as shown in FIGS. 7A and 7G. When a predetermined period of time T elapses, the timer 9 sets the latch 4 and turns the output terminal Q of latch 4 to a ONE (see FIG. 7H). When the terminal $\overline{WR}$ of CPU 12 becomes a ZERO before the time T expires, the OR gate 5 produces a ZERO to allow data to be written in the memory 11, as shown in FIG. 7J. The period of time T is selected so as to be slightly longer than the maximum duration of a sequence of data which may be written in the memory 11.

When CPU 12 starts writing data in the memory 11, the NOR gate 3 outputs a ONE, as shown in FIG. 7F, making the timer 9 start. Upon completion of write-in, the output terminal Q of latch 4 becomes a ONE, as shown in FIG. 7H. Hence, although the terminal $\overline{WR}$ of CPU 12 may become a ZERO afterwards, the output terminal Q of latch 4 remains a ONE. The OR gate 5 therefore remains a ONE, as shown in FIG. 7J, inhibiting data from being written in the memory 11. It will be seen that as long as CPU 12 operates normally, the circuit of FIG. 6 operates in exactly the same manner as the circuit of FIG. 1.

When the write-in of data in the memory 11 has been normally started and then CPU 12 operates out of control, data may erroneously be written in the memory 11. In the illustrative embodiment, however, the timer 9 sets the latch 4 upon the lapse of the predetermined period of time T. This inhibits any further data from written in the memory 11, i.e., prevents the data stored in the memory 11 from being destroyed any further.

As described above, the embodiment of FIG. 6 is successful in minimizing the destruction of data stored in the memory 11 due to the malfunction of CPU 12 which may otherwise occur while a writing operation is under way. It is to be noted that the timer 9 shown in FIG. 6 is also applicable to any of the embodiments of FIGS. 3, 4 and 5 for the above-described purpose.

What is claimed is:

1. A protection circuit for a memory in which data from a processing device including a write control terminal may be written, comprising:
    first decoder means for detecting a first pattern which is included in data to be written into said memory to produce a first detection output;
    second decoder means for detecting a second pattern which is included in address data, to produce a second detection output; and
    control means for enabling data to be written in said memory when both said first and second decoder means produce said first and second detection outputs, respectively, and for cancelling the enabled condition when said second decoder means produces said second detection output and said first decoder means does not produce said first detection output.

2. A protection circuit as claimed in claim 1, wherein said second decoder means comprises means for producing said second detection output when detecting said second pattern, and means for producing a third detection output when detecting an address of said memory out of said address data; and wherein said control means comprises NOR gate means receiving said second detection output and a write control signal applied from said write control terminal of said processing device to said memory, flip-flop means having a Q terminal output and also having a data terminal and a clock terminal to which said first detection output and the output of said NOR gate means are applied, respectively, and OR gate means receiving said write control signal and said Q terminal output of said flip-flop means for providing the output thereof to said write control terminal of said memory.

3. A protection circuit for a memory in which data from a processing device including a write control terminal may be written, comprising:
    first decoder means for detecting a first pattern which is included in data to be written into said memory to produce a first detection output;
    second decoder means for detecting a second pattern which is included in address data, to produce a second detection output; and
    control means for enabling data to be written in said memory only for a predetermined period of time from an instant when both said first and second decoder means produce said first and second detection outputs, respectively.

4. A protection circuit as claimed in claim 3, wherein said second decoder means comprises means for producing said second detection output when detecting said second pattern, and means for producing a third detection output when detecting an address of said memory out of said address data; and wherein said control means comprises NOR gate means receiving said second detection output and a write control signal applied from said write control terminal of said processing device to said memory; timer means started in response to the output of said NOR gate means and having a timer time which is equal to said predetermined period of time; flip-flop means having a Q terminal output and also having a data terminal, a clock terminal and a set terminal to which the output of said first decoder means, the output of said NOR gate means and the output of said timer means are applied, respectively; and OR gate means receiving said write control signal and said Q terminal output of said flip-flop means for providing the output thereof to said write control terminal of said memory.

5. A protection circuit for a memory, comprising:
    first decoder means for detecting first predetermined data out of data to be written into said memory to produce a first detection output;
    second decoder means for detecting second predetermined data out of address data which is associated with the data to be written; and
    latch means for latching said first detection output when both said second detection output and a write command signal are applied thereto and selectively allowing and for inhibiting data from being written in said memory based on the content being latched by said latch means.

6. A protection circuit as claimed in claim 5, further comprising timer means for restoring said latch means to a condition which has occurred before latching when a predetermined period of time elapses after said latch means has latched said first detection output.

7. A protection circuit for a memory, including a write control terminal and a chip select terminal, in which data from a processing device may be written, comprising:
first decoder means for detecting a first pattern which is included in data to be written into said memory;
second decoder means for detecting a second pattern which is included in address data; and
control means responsive to the outputs of said first and second decoder means for controlling the writing of data from said processing device into said memory.

8. A protection circuit as claimed in claim 7, wherein said control means controls, in response to the outputs of said first and second decoder means and to a write control signal fed from said processing device toward said memory, the writing of data into said memory on the basis of a condition representing the feed of said write control signal to said memory.

9. A protection circuit as claimed in claim 8, wherein said control means comprises NOR gate means receiving said write control signal and the output of said second decoder; flip-flop means having a Q terminal output and also having a data terminal and a clock terminal to which the output of said first decoder means and the output of said NOR gate means are applied, respectively; and OR gate means receiving said write control signal and said Q terminal output of said flip-flop means for providing the output thereof to said write control terminal of said memory.

10. A protection circuit as claimed in claim 9, wherein said second decoder means comprises means for detecting an address of said memory out of said address data to provide a detection output to said chip selector terminal of said memory.

11. A protection circuit as claimed in claim 7, wherein said control means comprises means responsive to the outputs of said first and second decoder means and to a write control signal fed from said processing circuit toward said memory, for controlling the writing of data into said memory on the basis of a condition representing the feed of a chip selector signal which is fed to said chip selector terminal of said memory.

12. A protection circuit as claimed in claim 11, wherein said second decoder means further comprises means for producing an address detection signal when detecting an address of said memory out of said address data, and wherein said control means comprises NOR gate means receiving said write control signal and the output of said second decoder; flip-flop means having a Q terminal output and also having a data terminal and a clock terminal to which the output of said first decoder means and the output of said NOR gate means are applied, respectively; AND gate means receiving said Q terminal output of said flip-flop means and a read control signal which is fed from said processing device toward said memory; and OR gate means receiving the output of said AND gate means and said address detection signal for providing the output thereof as said chip selector signal to said chip selector terminal.

13. A protection circuit as claimed in claim 7, wherein said processing device and said memory each comprises a terminal for inputting and outputting data serially, and wherein said control means comprises means responsive to the outputs of said first and second decoder means and to a write control signal from said processing device for controlling the writing of data into said memory on the basis of a condition representing the feed of a chip selector signal which is fed to said chip selector terminal of said memory.

14. A protection circuit as claimed in claim 13, wherein said control means comprises NOR gate means receiving said write control signal and the output of said second decoder means; and flip-flop means having a Q terminal output and also having a data terminal and a clock terminal to which the output of said first decoder means and the output of said NOR gate means are applied, respectively, for providing said Q terminal output thereof as said chip selector signal to said chip selector terminal.

15. A protection circuit as claimed in claim 7, wherein said processing device and said memory each comprise a terminal for inputting and outputting data serially and a serial clock terminal, and wherein said control means comprises means responsive to the outputs of said first and second decoder means and to a write control signal from said processing device for controlling the writing of data into said memory on the basis of a condition representing the feed of a serial clock which is fed from said processing device to said memory.

16. A protection circuit as claimed in claim 15, wherein said control means comprises NOR gate means receiving said write control signal and the output of said second decoder; flip-flop means having a data terminal and a clock terminal to which the output of said first decoder means and the output of said NOR gate means are applied, respectively; and AND gate means receiving said $\overline{Q}$ terminal output of said flip-flop means and said serial clock for providing the output thereof to said serial clock terminal of said memory.

17. A protection circuit for a memory including a write control terminal in which data from a processing device may be written, comprising:
first decoder means for detecting a first pattern which is included in data to be written in said memory;
second decoder means for detecting a second pattern which is included in address data; and
control means responsive to the detection outputs of said first and second decoder means for enabling data from said processing device to be written in said memory only for a predetermined period of time.

18. A protection circuit as claimed in claim 17, wherein said control means comprises means responsive to the outputs of said first and second decoder means and to a write control signal fed from said processing device to said memory for controlling the writing of data into said memory on the basis of a condition representing the feed of said write control signal to said memory.

19. A protection circuit as claimed in claim 18, wherein said control means comprises NOR gate means receiving said write control signal and the output of said second decoder means; timer means started in response to the output of said NOR gate means and having a timer time which is equal to said predetermined period of time; flip-flop means having a Q terminal output and also having a data terminal, a clock terminal and a set terminal to which the output of said first decoder means, the output of said NOR gate means and the output of said timer means are applied, respectively; and OR gate means receiving said write control signal and said Q terminal output of said flip-flop means for providing the output thereof to said write control terminal of said memory.

20. A method of protecting a memory in which data from a processing device may be written, comprising the steps of:
   detecting a first pattern out of data to be written into said memory;
   detecting a second pattern out of address data; and
   controlling the writing of data from said processing device into said memory in response to detection of said first and second patterns.

21. A method as claimed in claim 20, wherein the step of controlling the writing comprises the steps of:
   enabling said writing when both said first and second patterns are detected; and
   cancelling the enabled condition when said second pattern is detected and said first pattern is not detected.

22. A method as claimed in claim 20, wherein the step of controlling the writing comprises the steps of:
   enabling said writing when both said first and second patterns are detected; and
   cancelling the enabled condition when a predetermined period time elapses after said writing has been enabled.

* * * * *

UNITED STATES PATENT AND TRADEMARK OFFICE
CERTIFICATE OF CORRECTION

PATENT NO. : 4,897,819

DATED : January 30, 1990

INVENTOR(S) : Hiroshi Takizawa

It is certified that error appears in the above-identified patent and that said Letters Patent is hereby corrected as shown below:

Col. 1, line 32, delete "are" and insert --is--;

Col. 3, line 44, delete "~~CS1~~" and insert --$\overline{CS1}$--;

Col. 3, line 62, delete "inespective" and insert --irrespective--;

Col. 3, line 64, delete "$\overline{CS}$1" and insert --$\overline{CS1}$--;

Col. 3, line 68, delete "CS1" and insert --$\overline{CS1}$--;

Col. 4, line 33, delete "$\overline{CS}$1" and insert --$\overline{CS1}$--.

Signed and Sealed this

Twenty-third Day of April, 1991

*Attest:*

HARRY F. MANBECK, JR.

*Attesting Officer*   *Commissioner of Patents and Trademarks*